United States Patent
Zajac et al.

(10) Patent No.: US 6,315,267 B1
(45) Date of Patent: Nov. 13, 2001

(54) ELECTRICALLY CONTROLLED SERVO OPERATED ENGINE COOLANT VALVE

(75) Inventors: Christopher A. Zajac, Macomb Township; Christopher J. Babin, Rochester Hills, both of MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/397,693

(22) Filed: Sep. 16, 1999

(51) Int. Cl.[7] .................................................. F16K 31/04
(52) U.S. Cl. ................. 251/69; 251/129.02; 251/129.11; 251/292; 251/316
(58) Field of Search .................... 251/129.02, 129.11, 251/129.12, 129.13, 291, 292, 309, 312, 313, 69, 314, 316, 317, 68, 70, 71

(56) References Cited

U.S. PATENT DOCUMENTS

| | | | |
|---|---|---|---|
| 1,698,174 | * 1/1929 | Sauter | 251/129.12 X |
| 3,991,975 | * 11/1976 | Sibrava | 251/309 |
| 4,270,849 | * 6/1981 | Kalbfleisch | 251/292 |
| 4,719,939 | * 1/1988 | Killian | 251/292 X |
| 5,205,534 | * 4/1993 | Giordani | 251/129.11 |
| 5,226,454 | * 7/1993 | Cabalfin | 251/129.12 X |
| 5,706,851 | * 1/1998 | Lopez-Gomez et al. | 251/309 X |
| 5,881,996 | * 3/1999 | Walsh, Jr. et al. | 251/309 |
| 5,901,944 | * 5/1999 | Ramakrishnan et al. | 251/309 X |
| 6,073,907 | * 6/2000 | Schreiner et al. | 251/129.12 |

* cited by examiner

Primary Examiner—Kevin Shaver
Assistant Examiner—Eric Keasel
(74) Attorney, Agent, or Firm—Roger A. Johnston

(57) ABSTRACT

An engine coolant valve has a valve body with rotatable valve member thereon with a cylindrical configuration cross ported for rotary sealing against an arcuately shaped elastomeric face seal. A torque motor is attached to the valve body and has the motor rotor drivingly engaging a hub on the valve member.

15 Claims, 2 Drawing Sheets

ELECTRICALLY CONTROLLED SERVO OPERATED ENGINE COOLANT VALVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to water valves of the type intended for controlling flow of internal combustion engine coolant between the engine cooling passages and an exterior heat exchanger, for example, the heater core for a vehicle passenger compartment.

Heretofore, motor vehicle heater core water valves have typically either been manually actuated by a cable connected to a crank provided on the shaft of a butterfly plate type valve; or, the crank for the butterfly plate was connected by a link to a pressure operated diaphragm in a vacuum powered actuator.

Butterfly plate type water valves have proven to be generally reliable and low in manufacturing costs and thus have found widespread usage in automotive heater applications. However, butterfly plate type valves have the disadvantage of being quite non-linear in their flow control characteristics inasmuch as full flow of the valve occurs at about only one-quarter of the fully open position. This characteristic of butterfly type valves has resulted in difficulties in actuating the valve to obtain a predetermined amount of flow therethrough. Vacuum pressure actuators are limited in their size; and, thus the restricted diaphragm area limits the stroke resolution for pressure changes over the available range. Manual cable actuation has resulted in almost no useful modulation of the water flow.

Therefore it has been desired to provide an electrically operated heater core water valve to facilitate more accurate positioning of the valve member and therefore improved control over the flow of the coolant to the heater core. This is particularly desirable in a vehicle passenger compartment climate control system which is designed to provide automatic or thermostatically controlled temperature regulation in the passenger compartment. Heretofore electrically operated heater core water valves have employed a low voltage high RPM low torque motor driving a sector gear through a numerically high ratio gear reduction in order to provide the requisite torque needed to control the butterfly in the water valve and sufficiently fine resolution of the butterfly plate movement. Such servo motor operated speed reduced electric actuators have proven to be bulky and difficult to install on a water valve and in addition have resulted in relatively high manufacturing costs for the type of valve control desired.

Furthermore a motorized water valve employing a gear train does not permit automatic return of the valve to the open position in the event of electrical failure of the motor as is required in automotive passenger compartment heater applications.

Thus it has been desired to provide such a water valve for the passenger compartment heater core which will return to the fully open position in the event of failure of the servo motor.

In addition, it has long been desired to provide a simple, relatively low cost and reliable motorized water valve for controlling the flow to a vehicle passenger compartment heater core and to provide such a motorized valve which is compact and provides precision flow control.

BRIEF SUMMARY OF THE INVENTION

The present invention provides a torque motor operated water valve suitable for controlling flow of engine coolant to a vehicle passenger compartment heater core. The valve assembly of the present invention has the torque motor mounted directly to the integrally formed inlet and outlet fittings with the motor rotor drivingly engaging a cross ported rotary valve spool or barrel type valve member. The valve member is assembled into the valve body with a curved sealing member which is disposed to seal between the face of the rotary valve member and one of the inlet and outlet port openings. The seal member is preferably formed of thermoplastic elastomer material. The cross ported barrel type valve of the present invention, having the valving port aligned centrally with the inlet and outlet port provides fine resolution of flow control, approaching that of a linear relationship between rotary movement of the valve member and flow. The invention valve provides a relatively low frictional torque resistance and thus enables the torque motor to readily and precisely position the valve member for the desired flow. The valve of the present invention is low in manufacturing cost and is particularly suitable for control by a microcomputer in an automatic temperature control system for the vehicle passenger compartment.

DETAILED DESCRIPTION OF THE INVENTION

Figure 1:
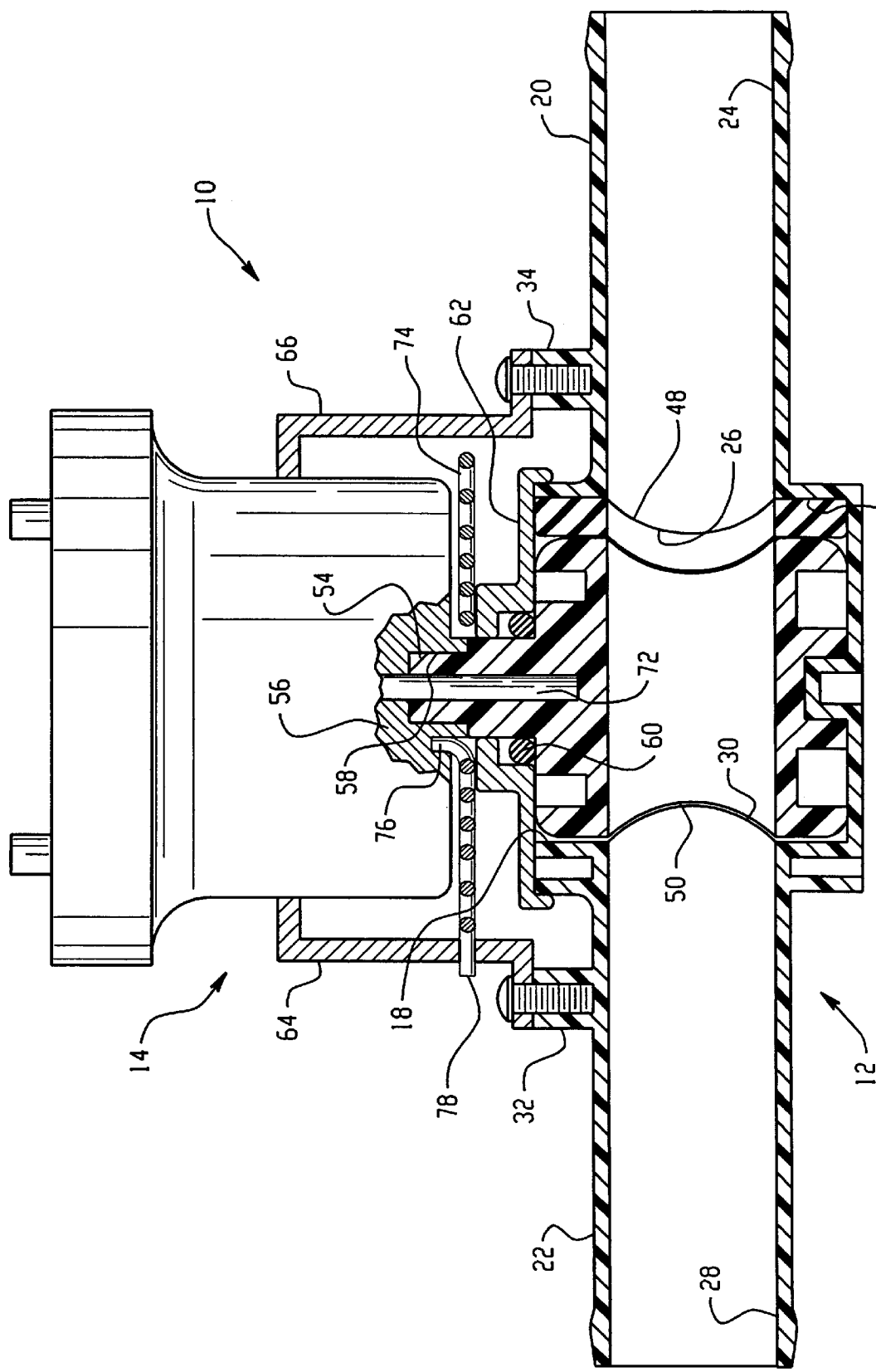
FIG. 1 is a cross-section of the assembled valve and motor of the present invention; and, FIG. 2 is an exploded view of the assembly of FIG. 1.
Figure 2:
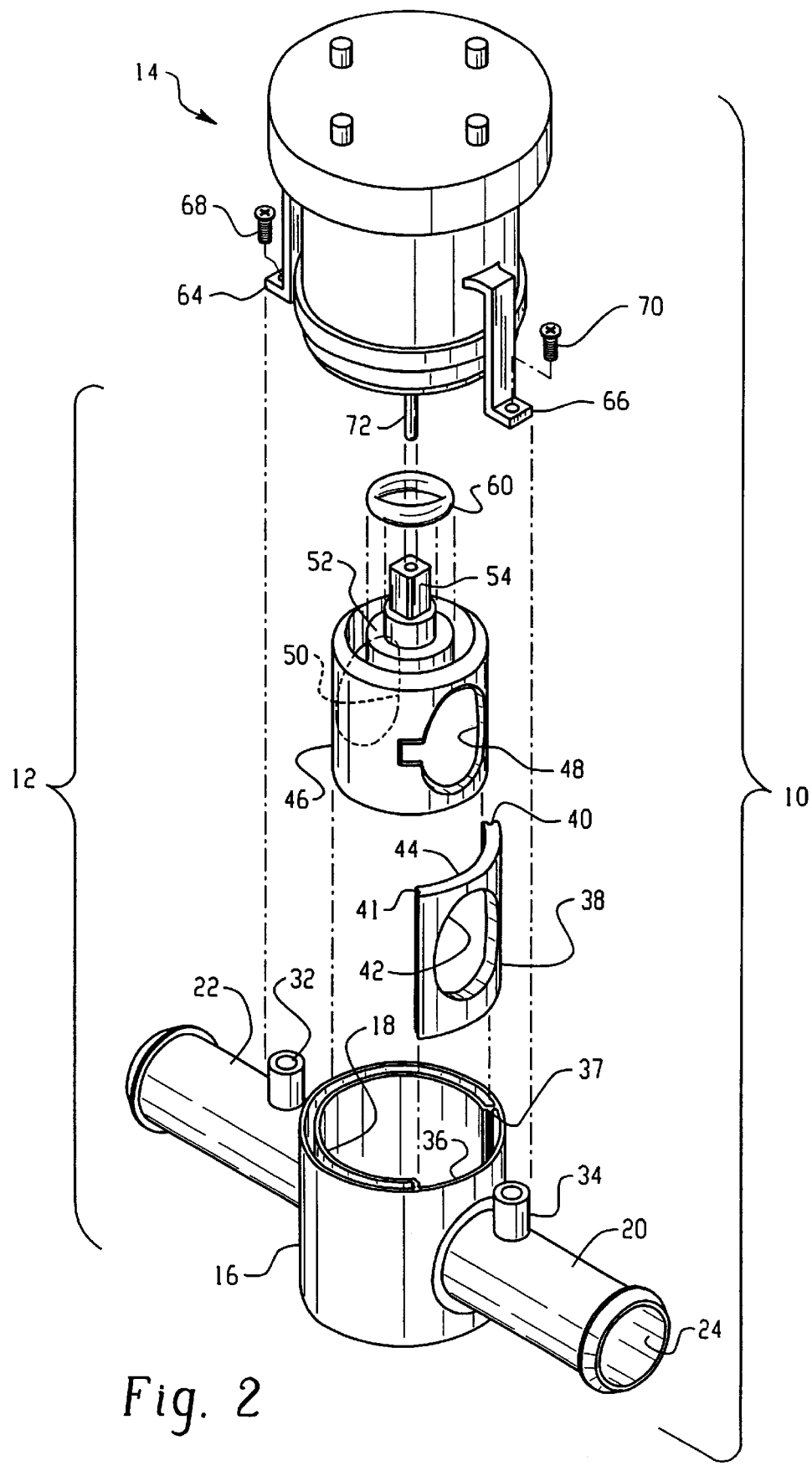

Referring to FIGS. 1 and 2, the electric servo operated valve assembly of the present invention is indicated generally at 10 and includes a valve body subassembly indicated generally at 12 and a motor subassembly indicated generally at 14. The valve body subassembly 12 includes a housing 16 having formed therein a generally cylindrical valving chamber 18 and an inlet port fitting 20 extending laterally therefrom and an oppositely directed outlet fitting 22 extending from the housing 16 generally in alignment with the fitting 20. Fitting 20 has an inlet passage 24 formed therein which is ported to the valving chamber 18 at 26; and, outlet fitting 22 has formed therein an outlet passage 28 which is ported at 30 to the valving chamber 18.

The inlet fitting 22 has a stanchion or raised boss 32 formed thereon; and, similarly the inlet fitting 20 has a stanchion or raised boss 34 formed thereon which extends in generally spaced parallel relationship with the stanchion 32.

The valving chamber 18 has an arcuate slot or groove 36 formed therein and centered about the inlet port 26. In the presently preferred practice of the invention, the radially extending sides of the groove 36 are slightly undercut for axial sliding engagement therewith. Undercut region of the sides of the groove 36 is denoted by reference numeral 37 in FIG. 2.

A resilient face sealing member 38 has a generally convex or concave partial cylindrical configuration when viewed from the edge thereof as illustrated in FIG. 2 and has a generally rectangular plan form configuration with the axially extending oppositely disposed sides thereof notched as indicated by reference numeral 40, 41 for sliding engagement with the undercut side of the groove 36.

The face seal member 38 has a centrally disposed aperture 42 formed therethrough which is sized to conform with the size of the inlet port 26. The face seal member 38 is received in the valving chamber in axial sliding assembly with the notches 40, 41 engaging the undercut sides 37 of the groove 36. It will be understood that when the face seal 38 is assembled in the groove 36 of valving chamber 18, that the radial thickness of portions of the face seal is such that such portions face seal on face 44 are configured to extend radially inwardly of the cylindrical wall of the chamber 18 by a suitable amount for ensuring a positive seal thereagainst.

A rotary valve member 46 having a generally cylindrical or barrel-like configuration has an inlet aperture 48 formed therein on the cylindrical face thereof and which communicates with a similar aperture 50 formed on the opposite side of the barrel 46 as shown in FIG. 1 and in dashed outline in FIG. 2. Rotary valve member or barrel 46 has an upwardly extending hub 52.

Hub 52 has extending upwardly therefrom a driving surface in the form of a stub shaft having a square transverse section as denoted by reference numeral 54 and which engages corresponding surfaces 58 provided on rotor 56 of motor 14. A seal ring 60 is disposed about the hub 52 and provides a seal between the hub and cover plate 62.

The motor 14 is attached to a body 16 by brackets 64, 66 disposed on opposite sides of the motor and each of which has an aperture therein through which is received a fastener such as screws 68, 70 which threadedly engage respectively bosses 32, 34 to retain the motor on the body. A guide pin 72 serves to pilot the motor rotor engagement with driving surface 54.

A torsion spring 74 is disposed about the hub 52 and has one end 76 anchored in the motor rotor with an opposite reaction end 78 thereof anchored in bracket 64; and, spring 74 serves to return the motor rotor and hub 52 to a position rotating the barrel 46 to the open position permit flow through the valve in the event of de-energization of the motor 14.

In operation, the torque motor is operable upon selective energization to rotate the barrel from a position allowing full flow through the inlet and outlet of the valve body to various position restricting the flow until the flow is completely blocked by rotation of the barrel 48.

The present invention thus provides a relatively low cost, simple and reliable construction for a motorized coolant valve for controlling flow between an inlet and an outlet and is particularly suitable for use with engine coolant supplied to a vehicle passenger compartment heater core and provides the desired resolution of flow with rotation of the valve barrel by a torque motor requiring a minimum of current to rotate the valve member.

Although the invention has hereinabove been described with respect to the illustrated embodiments, it will be understood that the invention is capable of modification and variation and is limited only by the following claims.

What is claimed is:

1. An electrically operated valve assembly comprising:
   (a) a valve body having a valving chamber with inlet port and an outlet port, each communicating with the valving chamber;
   (b) a generally cylindrical valve member disposed in said valving chamber and journalled therein for rotation between an open and closed position said valve member having a cross port therethrough and first driving surfaces formed thereon;
   (c) a resilient seal member having a curved plate configuration disposed in said chamber to seal between said valve member and one of said inlet and outlet port;
   (d) a torque motor attached to said body exteriorly of said valving chamber and having a rotor with second driving surfaces formed thereon engaging said first driving surfaces on said valve member and, upon electrical energization of said motor and movement of said rotor, said rotation of said valve member is effected, wherein said cross port is positioned for permitting flow between said inlet port and outlet port in said open position and positioned for preventing flow between said inlet and outlet port in said closed portion; and,
   (e) spring means biasing said rotor and valve member to the open position.

2. The valve assembly defined in claim 1, wherein said second driving surfaces are formed on one end of said rotor; and, said rotor and said valve member are coaxially aligned.

3. The valve assembly defined in claim 1 wherein said seal member is slidably received in a pair of spaced generally parallel grooves formed on opposite sides of said one of said inlet and outlet port.

4. An electrically operated valve assembly comprising:
   (a) a valve body having a valving chamber with inlet port and an outlet port, each communicating with the valving chamber;
   (b) a generally cylindrical valve member disposed in said valving chamber and journalled therein for rotation between an open and closed position said valve member having a cross port therethrough, wherein said valve member has a hub portion extending exteriorly of said chamber and journalled for rotation in said body, said hub including rotary seal means sealing between said hub and said body;
   (c) a resilient seal member disposed to seal between said valve and one of said inlet and outlet port;
   (d) a torque motor attached to said body and having a rotor operatively connected for, upon electrical energization, effecting said movement of said valve member, wherein said cross port is positioned for permitting flow between said inlet port and outlet port in said open position and positioned for preventing flow between said inlet and outlet port in said closed portion; and,
   (e) spring means biasing said rotor and valve member to the open position.

5. The valve assembly defined in claim 4, wherein said inlet port and said outlet port are aligned and are oppositely directed.

6. The valve assembly defined in claim 4, wherein said torque motor includes a pair of oppositely disposed mounting brackets and said body includes an inlet fitting and an outlet fifting, with one of said pair of brackets attached to each of said fittings.

7. The valve assembly defined in claim 4, wherein said valve body includes an inlet fitting with said inlet port formed therein, an outlet fifting with said outlet port formed therein formed integrally with said valving chamber and a cap member closing said chamber, said cap member having said valve member journalled thereon.

8. The valve assembly defined in claim 4, wherein said body includes a cap member for closing said chamber; and, said body includes an inlet fitting having first mounting surfaces formed integrally thereon and an outlet fitting having second mounting surfaces formed integrally thereon with said motor attached to said first and second mounting surfaces.

9. The valve assembly defined in claim 4, wherein said torque motor includes a torsion spring thereon for biasing said rotor.

10. The valve assembly defined in claim 4, wherein said seal member is formed of thermoplastic elastomer material.

11. The valve assembly defined in claim 4, wherein said valve member has a hub portion journalled for rotation on said body with said motor rotor having a shaft in driving engagement with said hub.

12. A method of making an electrically operated valve assembly comprising:
 (a) forming a valve body having a valving chamber, an inlet and an outlet fitting each ported to the chamber and formed integrally as one piece;
 (b) journalling a cross ported valve member in said chamber and journalling an end of said valve member in said chamber;
 (c) attaching a motor to said body and connecting the shaft of said motor to said valve member for effecting rotation thereof;
 (d) forming a pair of retaining surfaces on opposite sides of one of said inlet and outlet port and disposing a resilient seal member in engagement with said retaining surfaces between said one port and said valve member; and,
 (e) biasing said valve member in a direction aligning said cross port with said inlet and outlet port.

13. The method defined in claim 12, wherein said step of disposing a resilient seal between one of said inlet and outlet ports and said valve member includes sliding a resilient seal member in engagement with said pair of retaining surfaces.

14. The method defined in claim 12, wherein said step of journalling includes forming a hub on said valve member, extending said hub exteriorly of said chamber and engaging said hub with the motor shaft.

15. The method defined in claim 12, wherein said step of forming a body includes forming said inlet and outlet fitting extending in opposite directions.

* * * * *